US012586089B2

(12) United States Patent
Mousset et al.

(10) Patent No.: US 12,586,089 B2
(45) Date of Patent: Mar. 24, 2026

(54) METHOD AND SYSTEM FOR PROCESSING EXPERIENCE DIGITAL CONTENTS

(71) Applicant: TAOCI EXPERIENCES SAS, Versailles (FR)

(72) Inventors: Jean-Marc Mousset, Versailles (FR); Sylvain Allano, Montlhéry (FR)

(73) Assignee: TAOCI EXPERIENCES SAS, Versailles (FR)

( * ) Notice: Subject to any disclaimer, the term of this patent is extended or adjusted under 35 U.S.C. 154(b) by 0 days.

(21) Appl. No.: 17/278,607

(22) PCT Filed: Sep. 20, 2019

(86) PCT No.: PCT/EP2019/075417
§ 371 (c)(1),
(2) Date: Mar. 22, 2021

(87) PCT Pub. No.: WO2020/058514
PCT Pub. Date: Mar. 26, 2020

(65) Prior Publication Data
US 2021/0357954 A1 Nov. 18, 2021

(30) Foreign Application Priority Data
Sep. 20, 2018 (FR) ..................................... 1858552

(51) Int. Cl.
*G06Q 30/0201* (2023.01)
*G06Q 50/00* (2024.01)
(52) U.S. Cl.
CPC ......... *G06Q 30/0201* (2013.01); *G06Q 50/01* (2013.01)

(58) Field of Classification Search
USPC ...................................................... 705/7.29
See application file for complete search history.

(56) References Cited

U.S. PATENT DOCUMENTS

| | | | |
|---|---|---|---|
| 4,323,034 A | | 4/1982 | Carlson |
| 6,976,452 B1 | | 12/2005 | Godsil |

(Continued)

FOREIGN PATENT DOCUMENTS

| | | | |
|---|---|---|---|
| CN | 107516245 A | 12/2017 | |
| DE | 0526357 A | 6/1931 | |

(Continued)

OTHER PUBLICATIONS

Reijers, W., Coeckelbergh, M. The Blockchain as a Narrative Technology: Investigating the Social Ontology and Normative Configurations of Cryptocurrencies. Philos. Technol. 31, 103-130 (2018). https://doi.org/10.1007/s13347-016-0239-x (Year: 2018).*

(Continued)

*Primary Examiner* — Kristin E Gavin
(74) *Attorney, Agent, or Firm* — TraskBritt

(57) ABSTRACT

A method of processing experience-content data within natural language narratives comprises the steps of: capturing experience-content data from of one or more sources of information, analyzing the captured experience-content data so as to identify narrative structures, and linking each of the identified narrative structures to an actant category among a set of predetermined actant categories constituting an actantial scheme. The capturing step implements a conversational agent that is programmed to capture additional experience-content data, until all actant categories of the actantial scheme are filled with captured experience-content data.

18 Claims, 4 Drawing Sheets

1. Made of experiential multimedia units content is captured or collected through the Internet or conversational agents in order to build a co-created experiential book of narratives 2. All the experiential units are categorized in the actantial scheme forming a blockchain of experiences and component units of experiences ( book of experience narratives)

3. Blockchain and expert group of supervisors ensure the experiential units transactions are encrypted and validated 4. All the transactions units are recorded in the book of narratives built by the block chains, all the single units of experiences are added to chains 5. The updated book of experience narratives is replicated in the network of experiential blockchains 6. The transaction of the experiential units is validated: the co-creator(s) of the experiences can get the monetized reward of their production of experiences in the blockchains if they wish so. All the members of the experiential blockchains can access the experience

(56) References Cited

U.S. PATENT DOCUMENTS

| | | | | |
|---|---|---|---|---|
| 10,839,798 B2 * | 11/2020 | Krishnan | ............... | G06Q 10/00 |
| 2009/0171902 A1 | 7/2009 | MacLaurin et al. | | |
| 2012/0213212 A1 | 8/2012 | Moore et al. | | |
| 2014/0108006 A1 * | 4/2014 | Vogel | .................. | G06F 16/9535 |
| | | | | 704/9 |
| 2015/0234805 A1 * | 8/2015 | Caswell | ............... | G06F 40/279 |
| | | | | 704/9 |
| 2016/0042359 A1 * | 2/2016 | Singh | ...................... | G06F 40/30 |
| | | | | 704/2 |
| 2017/0103472 A1 * | 4/2017 | Shah | ...................... | G06Q 50/01 |
| 2018/0075393 A1 * | 3/2018 | Lovell | ............... | G06Q 30/0267 |
| 2018/0102989 A1 * | 4/2018 | Borsutsky | ............... | G06F 40/35 |
| 2018/0174187 A1 * | 6/2018 | Stekkelpak | ........ | G06Q 30/0277 |
| 2018/0225365 A1 * | 8/2018 | Altaf | .................... | G06F 16/3344 |
| 2018/0288225 A1 * | 10/2018 | Fang | ....................... | G10L 21/10 |
| 2018/0337872 A1 * | 11/2018 | Fawcett | ................... | G06F 8/31 |
| 2019/0043106 A1 * | 2/2019 | Talmor | ............... | G06Q 30/0617 |
| 2019/0244222 A1 * | 8/2019 | Rathod | .................. | G06Q 30/02 |
| 2019/0347668 A1 * | 11/2019 | Williams | ........... | G06Q 30/0201 |

FOREIGN PATENT DOCUMENTS

| | | | | | | |
|---|---|---|---|---|---|---|
| KR | 20180052489 A | * | 5/2018 | | ......... | G06Q 30/0631 |
| NL | 1033723 A | | 7/2008 | | | |
| WO | 2007/080192 A1 | | 7/2007 | | | |
| WO | WO-2019245943 A1 | * | 12/2019 | | ......... | G10L 15/1815 |

OTHER PUBLICATIONS

Rozga, Szymon. "Building an Integrated Bot Experience." Practical Bot Development: Designing and Building Bots with Node. js and Microsoft Bot Framework. Berkeley, CA: Apress, 2018. 305-354. (Year: 2018).*

Holbrook et al., The Experiential Aspects of Consumption: Consumer Fantasies, Feelings, and Fun, The Journal of Consumer Research, vol. 9, No. 2, (Sep. 1982), pp. 132-140.

International Search Report for International Application No. PCT/US2019/038767 dated Oct. 1, 2019, 2 pages.

International Written Opinion for International Application No. PCT/US2019/038767 dated Oct. 1, 2019, 7 pages.

Taupin et al., Automotive Ambience Imaginaries and the Semiotics of Narratives: an Approach to Digital Experiential Innovation in China, https://tel.archives-ouvertes.fr/tel01726295, Submitted Mar. 8, 2018, 411 pages.

Barthes et al., An Introduction to the Structural Analysis of Narrative, New Literary History, vol. 6, No. 2, On Narrative and Narratives. (Winter, 1975), pp. 237-272.

Greimas A. Julien, Elements for a theory of the interpretation of the mythical narrative, Research semiological: structural analysis of the story, In: Communications, vol. 8, (1966), pp. 28-59.

Hebert, Louis, The Semiotic Square, http:/signosemio.com/greimas/semiotic-square.asp, Applied Semiotics Theories, vol. 22, No. 19, (2006), 7 pages.

* cited by examiner

1. Made of experiential multimedia units content is captured or collected through the Internet or conversational agents in order to build a co-created experiential book of narratives

2. All the experiential units are categorized in the actantial scheme forming a blockchain of experiences and component units of experiences ( book of experience narratives)

3. Blockchain and expert group of supervisors ensure the experiential units transactions are encrypted and validated

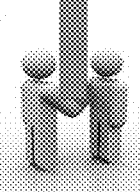

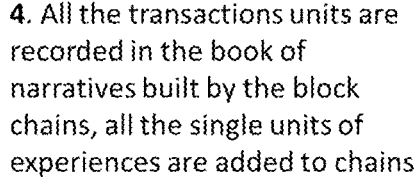

4. All the transactions units are recorded in the book of narratives built by the block chains, all the single units of experiences are added to chains

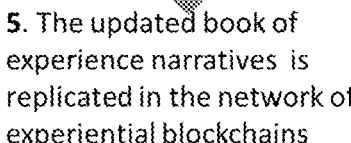

5. The updated book of experience narratives is replicated in the network of experiential blockchains

6. The transaction of the experiential units is validated: the co-creator(s) of the experiences can get the monetized reward of their production of experiences in the blockchains if they wish so. All the members of the experiential blockchains can access the experience

*FIG. 2*

"To celebrate the end of the year, I was yesterday with my twin brother Nicolas and his new girlfriend in this restaurant near the symbol of Paris, the Eiffel Tower. We ate amazing food and thanks to the waitress, the ambiance was very friendly. I enjoyed the blue plates they used. What I did not like was the music that was too loud, despite this the ambiance was quite nice. At the end of the dinner, I felt relaxed and happy because I don't see them very often."

| Semiotic text analytics categories | TAOCI case | Markers |
|---|---|---|
| ACTANTIAL SCHEME | | |
| Subject | Sebastien | |
| Object of the quest | Relaxation and joy | At the end |
| Receiver | Sebastien | |
| Sender | Sebastien | |
| Helper | The funny waitress, the blue plates ( magical object that is a helper to achieve the experience) | Thanks to |
| Opponent | Music ( too loud) | Despite |
| Mythical object | The Eiffel Tower | |
| NARRATIVE SCHEME | | |
| Initial lack | Stress, lack of time, lack of social relationships | Because |
| TESTS | | |
| Qualifying test and skills | Going to the restaurant nearby the Eiffel Tower | Can do |
| | | Text isotopies of haute cuisine ( restaurant, cuisine, meals) |
| Main decisive test | Eat a delicious french haute cuisine | |
| Glorifying test | Succeeding to relax during the meal | |
| TRANSFORMATION | | |
| EMOTIONAL STATE OF MIND TRANSFORMATION | Reward to enjoy transformation from stressful situtuation to relaxing one | The emotions, body sensations |
| AMBIANCE | The restaurant | |

FIG. 4

METHOD AND SYSTEM FOR PROCESSING EXPERIENCE DIGITAL CONTENTS

CROSS-REFERENCE TO RELATED APPLICATIONS

This application is a national phase entry under 35 U.S.C. § 371 of International Patent Application PCT/EP2019/075417, filed Sep. 20, 2019, designating the United States of America and published as International Patent Publication WO 2020/058514 A1 on Mar. 26, 2020, which claims the benefit under Article 8 of the Patent Cooperation Treaty to French Patent Application Serial No. 1858552, filed Sep. 20, 2018.

TECHNICAL FIELD

The present disclosure relates to a method and a system for processing experience digital contents.

The present disclosure concerns the field of digital marketing, marketing research, customer service, entertainment, industry, creative industries and of residential or mobile social networks. It also relates to aggregation of multimedia content in a structured way and to any content that can be digitized.

BACKGROUND

On social networks such as Facebook today, it is possible to post various media of individual or collective experiences, and in return to get a "social index,"—mainly based on views, likes and comments—and to see posts of friends, or posts from the page one likes and ads.

The problem is that posting messages, pictures, slideshows or even videos is not enough to share the whole experience and people also have a lot of experiences not relevant enough to be posted on social media, as they are too personal or not socially oriented.

According to recent research published on experience, the multiplication of social networks encourages consumers to share textual and imagery content on different social networks without it being possible to give coherence between the contents that are posted and thus preventing customers from bringing to light or creating valuable customer experiences.

Document US 2012/0213212 A1 discloses a system and method for analyzing, summarizing and transmitting life experience captures using a life recorder.

Document US 2009/0171902 A1 discloses a system that can automatically capture life experiences of a user across a number of senses or perceptions. Once the data is captured, it can be annotated and saved for subsequent playback.

Document US 2018/0075393 A1 discloses a computer-implemented method and system for calculating a metric of a user's social or environmental performance among a plurality of users. The processor executing the computer executable instructions identifies opportunities for social action be included in a content feed addressable to the user and provides opportunities generated by organizations to the user. The processor monitors interactions between the user and other users/organizations, monitors a type of interaction and associated social/environmental impact of the interactions, stores the interactions in a user profile, and determines from the user profile a social/environmental achievement or new contribution by the user.

Document CN 107 516 245 A discloses an information processing method of a content evaluation platform based on blockchain technology.

But customers in all consumer sectors are looking for valuable experiences on which brands base their offer of entertaining or informative content.

Social media networks actors can store and share content on the Internet. But as their knowledge of these networks grows, consumers aspire on the one hand to better monetize the personal content they publish and on the other hand to live and share experiences of value among themselves: this is the birth of personal experience monetization.

The purpose of the present disclosure is therefore to remedy these disadvantages.

It is an objective of the present disclosure to solve the issue for brands to access validated and trustworthy customer experience data, and the issue of the lack of trustworthy personal experience data marketplaces where customers, brands and market researchers can connect and exchange data and rewards freely.

BRIEF SUMMARY

This objective is reached by proposing a method of processing experience-content data within natural language narratives, comprising the steps of:

capturing experience-content data from of one or more sources of information, analyzing the captured experience-content data so as to identify narrative structures, linking each of the identified narrative structures to an actant category among a set of predetermined actant categories constituting an actantial scheme, the capturing step implementing a conversational agent that is programmed to capture additional experience-content data, until all actant categories of the actantial scheme are filled with captured experience-content data.

The method according to the present disclosure thus derives insights from unstructured text made of experience-content data (e.g., customer reviews, social media posts or emails) and reveals the structure and the meaning of the experience using natural language processing, machine learning and structural semiotics/linguistics.

The capturing step further can advantageously include capturing experience-content data from at least one social network or web site, or an application Web.

The method according to the present disclosure can further include a step of encrypting data of captured experience-contents, and/or a step of sharing experiences between users through a shared experiential blockchain.

According to a specific embodiment of the present disclosure, the experience-content data processing method can further comprise a step of providing to a third party access to an experiential blockchain including experience-content data sharing at least one common marker.

The method according to the present disclosure can be non limitatively implemented within a travel or accommodation web application, a web transportation application, a social network, an e-commerce web application, a foodtech web application, a simulation tool, an entertainment service, or within a customer experience service.

The present disclosure also provides a blockchain system for linking heterogeneous content of different databases of multimedia content between them according to a coherent experience.

The present disclosure further proposes to monetize these channels of content forming an experience in order to stimulate the exchanges between consumers of content offered on different social networks.

The narration of an experience can be approached as a language and a system of signs. The process according to the present disclosure allows to link linguistic and textual units as well as apparently heterogeneous symbols derived from blocks of content of different natures according to the principle of creation of an experience of redeemable (barter) or monetizable value.

The present disclosure allows transforming the scattered contents between different units of social networks into units of meaning contributing to a unique experience according to an invariant structure. The monetization of these experiences can be achieved by creating a virtual currency that users can exchange on the Internet or that they can use to acquire other network experiences.

With the process according to the present disclosure, the user will be able to share her or his experiences, by means of the "Chatbot/Blockchain" pair implemented in the claimed process, in a We-Community approach, but also to collect personalized experiential content for her or him, in an I-personal approach.

The terms "experience," "human experience," "life experience" or "human life experience," within the meaning of the present disclosure means memorable and powerful events in human beings lives consisting in the transformation of the self during a short time, which could be online or offline, real or virtual, lived or imagined or dreamed—such as but not limited to travel experiences, customer experiences, cultural and artistic experiences, food experiences, social experiences (games, friends, family, sports). Everyday life and dreams are series of experiences, focusing on those intangible (sensing, feeling) aspects of consumption and life has been recognized in the marketing literature (Hirschman, E. C., and Holbrook, M. B., (1982), The experiential aspects of consumption: consumer fantasies, feelings and fun, Journal of Consumer Research, 22 Vol. 9).

It has been demonstrated in the last published research in applied semiotics (Taupin, P. (2017), *Imaginaires d'ambiance automobile et semiotique des récits: une approche d'innovation experientielle digitale en Chine*, Doctoral dissertation, Université Pierre et Marie Curie-Paris VI) that the starting point of an experience is necessarily the human experience of the lack. This implies the quest for a new emotional state involving a stable structure of the narrative of the experience. This narrative is made of images, symbols, sentences, words, pictures or sounds, multimedia contents that are created by the single human being who actually lived this experience; it can also be produced by different people who co-create a narrative from their imaginary of the ideal experience and/or their actual experience. In order to achieve this quest, the human being should experience a global process in a given situational context where he is an actant who acts in an atmosphere or a surrounding. The narrative follows the pattern of the actantial model proposed by Greimas [Greimas, A. J. (1983). *Structural Semantics: An Attempt at a Method*. Lincoln: University of Nebraska Press], where the different parts of the actantial model reflecting the experience process and scheme are experiential units, which may be human beings, events, artefacts or any other element contributing to the achievement of the quest or hindering it. These experiential units can help achieving these experiences (helpers) or on the opposite hinder achieving the goal (opponents). Those findings bring forward the personal stories of individuals through their co-creation of narratives in contrast to previous post-written storytelling, hence the requirement of a technical solution in order to aggregate experience contents and make this underlying structure of human experiences visible, accessible and rated.

The process according to the present disclosure further includes a financial securities transfer solution that enables transactions and monetization of experiential units and co-created experience contents in the blockchain.

Furthermore, the process according to the present disclosure makes data more accessible, as market research data are generally hard to aggregate and process across projects. This data tends to live in silos, it is in different formats, and relates to different surveys, times etc.

The method according to the present disclosure can also contribute to keep all the information from a single person in a single blockchain, immutable and growing over time. This data would include not just market research data but data about their transactions, phone usage, exercise patterns, and all their smart home data.

Definitions

Experiential Unit:

According to the present disclosure, it is a unit obtained by processing captured experience-content data (according to the actantial model), and constituting the basic bricks of an experience chain.

It is the essential element that composes the experience; it can be either the object of the quest resulting from the lack or deprivation or an "actant," object or thing contributing to the realization of the experience or its narrative.

Experiential Chain:

According to the present disclosure, it is the chain of actors, co-creators of the experience and having the rights of validators of the recordings of the experiential units in the databases.

Experience:

Emotional transformation of an individual following a scheme and an axiomatic system meeting the three criteria test and the actantial scheme. An experience is made of sensing, feelings, emotions, acting, creating narratives in a given atmospheric context or ambience.

The three Tests:

According to Greimas A. J. (1983) "*Structural Semantics: An Attempt at a Method. Lincoln*": *University of Nebraska Press*, the Three Tests include a qualifying test, a main test and a glorifying test.

Experience-content data:

Any data describing or expressing an experience in any of its aspects (narrative, contextual, ambient, emotional, sensorial, socio-cultural). These data may include verbal, iconic and non-verbal data on any physical or virtual support.

Chatbot or Conversational Agent:

A computer program designed to simulate conversation with human users or any artificial intelligence agent, over communication networks or channels.

Experiential Blockchain (Blockchain):

System allowing storing, dispatching, tracking or capturing experiences or carrying out transactions of single or co-created experiences.

The system that allows these creators of experiences to cash in recorded experiences or to perform transactions from an electronic device for sharing experiences and the representation and transmission of monetizing financial securities.

BRIEF DESCRIPTION OF THE DRAWINGS

Other advantages and peculiarities of the present disclosure will appear on the reading of the detailed description of implementations and methods of implementation by no means limiting, and of the following drawings attached:

FIG. 2 is a schematic representation of the experience-content data process according to the present disclosure, resulting in a Book of experiential blocks (book of experience narratives)

FIG. 4 features a grid for analyzing experience-content data, implemented in the process according to the present disclosure.

DETAILED DESCRIPTION

Figure 1:
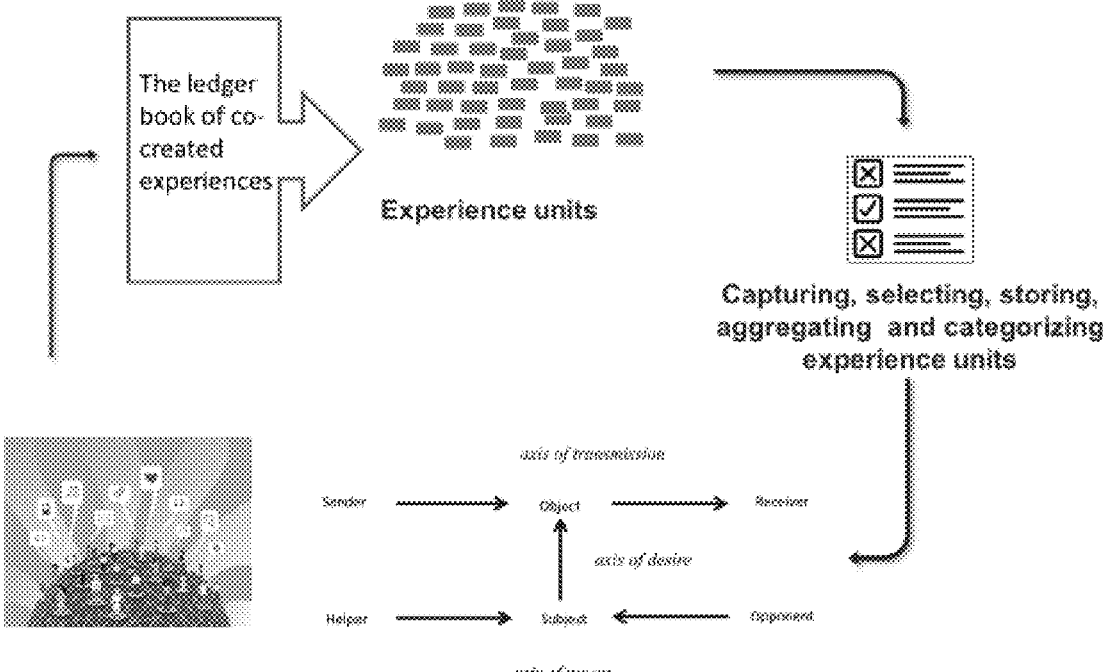
FIG. 1 schematically illustrates the global structure of the experience-content data process according to the present disclosure.
Figure 3:
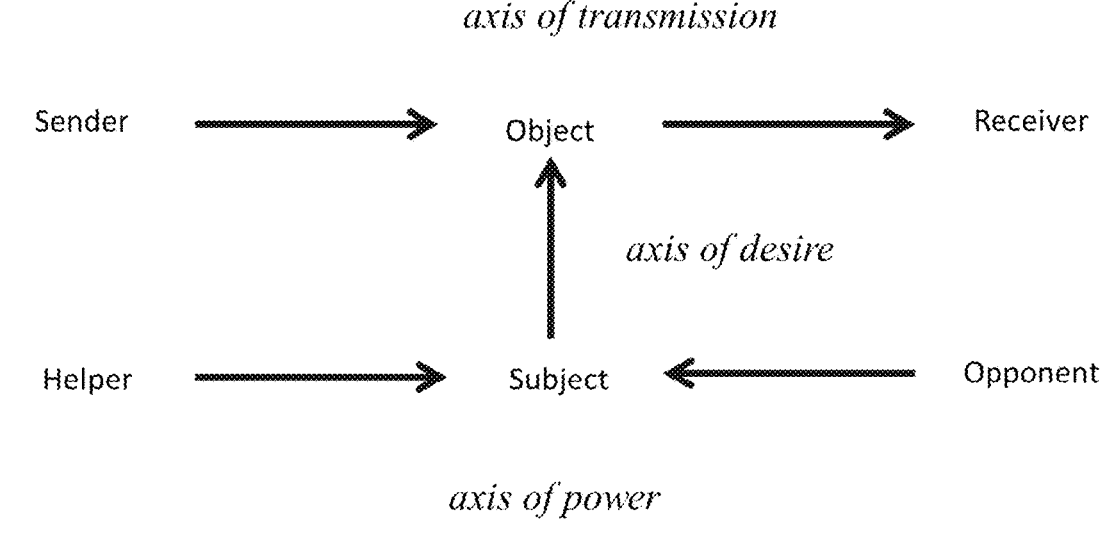
FIG. 3 illustrates an actantial scheme implemented in the method according to the present disclosure.

As the methods of implementation described below are by no means restrictive, it may be considered that variants of the present disclosure comprising only a selection of characteristics described, isolated from the other characteristics described (even if this Selection is isolated within a sentence containing these other characteristics), if this selection of characteristics is sufficient to confer a technical advantage or to differentiate the present disclosure from the prior art. This selection comprises at least one characteristic, preferably functional without structural details, or with only part of the structural details if this part only is sufficient to confer a technical advantage or for Differentiate the present disclosure from the prior art.

Each unit of experience units is referenced according to a given semantic field that classifies these units of experiences into specific blocks of the experiential chain.

Each block also contains elements related to the predecessor block (the transaction between objects or individuals in the experience) that are encoded using cryptographic methods.

The experience provider can only give one order at a time in the experiential path and the stamped orders are concatenated in the manner of a DNA sequence.

To maintain the confidentiality of the sequence of order that enables the experiential quest to be carried out, the orders are encrypted and form a chain that is stored in a "collection of narratives of experiences" and transactions between experiential imaginary (or actual lived experiences) and this "Book of narratives" are replicated and distributed to all experience providers.

Each book of narratives contains a summary of the previous book; it is a way of linking the books to each other. These books are files that are constituted of blocks called experiential blocks in the present disclosure. They are connected to each other and form a chain of experiential blocks.

The books follow each other and tell the experiential narrative. Each book tells the last adventures of the experiential narrative in a logical sequence.

The experiences recorded in the Blockchain are recorded in a book of narratives and narratives are structured in a fixed and homogeneous way and duplicated on several servers. A smart contract makes it possible to check the conformity of the records of the blockchain to the rules of construction of the narratives of the experience by a private network of expert supervisors.

This file register is protected by a very large number of keys, each of which corresponds to a line in this register.

To register a transaction, the one who has the right key can notify that the title of an experiential unit has been transferred to another person (it sells this property to that person):

a new line is created in the register. The new owner then has a key to change this experiential unit from the register and to assign a title to it.

The actors of the experiential chain supervisors may comprise:

Bridge actors who create or maintain links with other actors, a gatekeeper that controls the flow of experiential information that enters and leaves the network, trackers and sensors of experiential units, meaningful creators of experiential units, coordinators of creation of experiences in blockchains.

Narratives and Experience-Content Data Analysis

Narrative is present in an infinite variety of forms, in all the times, in all places, in all societies in a huge variety of media (Barthes, An introduction to the structural analysis of narratives, Communications, 1966).

Narratives are one of humanity's communication structures and storytelling is a means of passing on wisdom, culture and experience both individually and collectively.

From Taupin, "Narrative semiotics to innovate customers experiences," de Gruyter 2019, it is known that customers experiences can be extracted from text contents and that those experiences follow the pattern of narratives and fairytales earlier described under the theory of Structural Analysis of Narratives (French School of Semiotics) allowing for a deep understanding of their meaning. At the center of the theory is the actantial scheme that allows for categorizing the units that play a role in the customer's experience.

The method according to the present disclosure contributes to automate the analysis of meaning and the text analytics of experiential narratives. It thus combines both approaches of text analytics where subsequent developments have been made to meet the expectations of extracting, processing, and analyzing the narratives. It also contains a blockchain approach allowing to build a trustworthy monetizable rich content available on a platform allowing in return sharing, creating and clustering customers' experiences.

In a practical embodiment, the method according to the present disclosure is implemented as six component modules allowing for processing and creating new rich experiential contents:

The three first modules 1, 2 and 3 allow for a deep understanding of the structures and interactions between actants in the actantial scheme using the method of connectors that have been searched and defined to characterize the roles of actants in the actantial scheme. The six other modules 4, 5 and 6 allow for a deep understanding of meaning of the experience quest and a global modeling.

Module 1 is dedicated to Data collection of texts about consumer experiences. This module 1 implements chatbots and social networks.

Module 2 implements the actant identification process that describes the way for capturing and identifying the narrative structures of experiences in textual data. This module 2 comprises an analysis of the relationships between characters (actants) of the actantial scheme that together construct a network. Opponents and helpers are identified together with their actions in the actantial scheme.

The actants are beings or things that participate in the action-in whatever capacity and whatever style this might entail, even if it is as mere walk-ons and in the most passive way imaginable. Actants are always nouns or the equivalents of nouns. Inversely, in a given phrase nouns always assume, at least in principle, the function of actants.

There can be an analysis of nodes of actants, and other metrics as density and centricity index can help identifying who are the most influencing experiencers, applying the rules of social network analysis (open source) to text analytics. This allows for targeting, clustering experience influencers and topic modeling, and also define experiential blockchains. In this case, the categorization of each actant allows construction of homogeneous blocks of components or chained experiences.

FIG. 4 gives a practical example of a grid for analyzing experience-content data, which is implemented in the method according to the present disclosure and applied to an example of experience narrative.

Identifying actants does not imply identifying nodes of the relationships of characters in the stories, the method according to the present disclosure allows for a deep understanding of the roles and actions of the actants in the experiential building process. Markers or connectors of relationship types between actants and the object and subject of the experience quest have been identified and allows for identifying the roles of actants (beings or things) in the actantial scheme of the experiential narratives.

The actant identification system allows for the categorization of words depending on the markers that surround them. A predefined dictionary of markers together with Nearest neighbor search (NNS), as a form of proximity search, finding the verb in a given set that is closest (or most similar) to a given connector. A list of text markers and connectors has been pre-defined that allows finding out which markers are used in a natural language narrative to express the categories of actants of the actantial scheme: the quest, the opponents, the helpers, the reasons for the quest.

The connectors (being words or lemmas) are recorded in a database also called a dictionary of actantial scheme connectors. The database of connectors has also been completed by a database of emotion connectors; that is to say, the words or lemmas that play a role when emphasizing emotions.

The experiential text units (lexies) are also classified according to a set of rules that allows for categorization in the actantial scheme of the experience narratives. Each verb corresponding to a function of the actantial scheme is identified through its neighborhood to a marker of the role of an actantial unit.

Many categories of markers can be used in the method according to the present disclosure, such as quest markers, modality markers, recall markers, quest finality markers, meta-representative markers, markers of the opponents, markers of helpers to be processed, markers of qualifying test, markers of glorifying tests.

Module 3 is dedicated to qualifying emotions and body sensations at work in the experience narratives, by using semantic dictionaries. The outputs from this module categories of emotion. The dictionaries also encompass a dictionary of feelings and emotions together with the states of mind and gestures related to the emotions.

Module 4 implements identifying the isotopies within a narrative to be analyzed. Understanding the deep meaning of the experiences goes through identifying isotopies. Those isotopies will also allow to build the themes that are consumers' motivations of the experience quest and will be used as a basis for clustering people that will share contents on a digital experiential narratives platform implementing the method according to the present disclosure.

The minimal units of sense used to describe these structural relations within a corpus are called semes according to Greimassian structural semiotics principles (1966). Semes are not used to describe isolated words but rather are defined as sets of words related to them. Isotopies are not given a priori: isotopies and seme characterization are operated after a categorization of the dictionary of words that follow the connectors. From this process, it is possible to build dictionaries of lemmas playing a function in the actantial scheme. Isotopy recognition is triggered by keywords depending on the context they appear in. A self-supervised learning module is integrated allowing understanding the recurrence of semes; that is to say, an isotopy from an analysis of the context they appear in.

Hapax are analyzed separately and not excluded as they may reflect a specific context of the lemmas. Rare words are also taken into account as they might sometimes represent a large part of the corpus following Zipf's rules. Intertextuality of experiences schemes is possible through an analysis of both isotopies and semes at stake in the experiential narrative, allowing for clustering people living the same experiences and finding out which of a brand or service offer meets the themes of interest of various customers' clusters.

Module 5 is dedicated to identifying the "three tests" shape and patterns. This module 5 comprises identifying the three tests: qualifying, decisive and glorifying, as initially proposed by Greimas in his paper "Éléments pour une théorie de l'interprétation du récit mythique," Communications, vol. 8, no 8, 1966, p. 28-59.

It also helps to identify deep structures of meaning. It also comprises identifying in very different text contents the proven experiences fulfilling the three test conditions as analyzed.

Fractal self-similarity principle allows for capturing the patterns of self-similarity from the text analytics and graph presentations. A test that accounts for a basic component of the experience narrative is made visible through both identifying the key words that play a major role in the experience test and their dimension in terms of fractality degree. Characters (or things) Interaction self-similarity patterns are calculated and a power law of the fractal dimension of experiences is calculated allowing for the experience to be quantified and clustered according to their molecular structures. Fractal dimensions of experiences can thus inspire the world of Arts to create visual representations of experiences through fractal shapes: chaotic experiences can then be viewed as coherent systems in a global holistic approach. All the lexical units (words, lemmas, lexies) of the actantial scheme are thus captured, identified, categorized and quantified according to rules. A semi-supervised learning process allows for tagging the actantial units.

Module 6 is provided for organizing the data sets of meaningful experiences. This module 6 includes a process for clustering the experiential patterns according to the meaning. This process describes solutions for tracking and recording experiential customers narratives text content in a secured and trustworthy manner and for aggregating multimedia contents that build the experiences.

Blocks are chained and have an internal structure that chains sub-blocks in a fractal way so that any blocks can be attached to a blockchain of experiences allowing also to build a grammar and syntaxic approach of the three tests allowing for characterizing an actual customer experience. In opposition to traditional blockchains, the blockchain implemented in the method according to the present disclosure also has a structure that allows for building combinations of proven experience patterns.

A fractal approach of experience narratives patterns allows a recognition of the experiences tests as they are built on the same patterns but at different scales models. Such approach contributes to sharing within social networks. The clustering of experiencers and identification of key EXFLU-ENCER® actants (nodes of experience content sharing) is also possible.

Trade and Transactions

Each new transaction is stamped and integrated into a block of experiential units that must be integrated into the experiential chain. The transaction is encrypted and certified by the nodes of the experiential network. Certification is performed by experiential miners and a proof of work is provided attesting to the certification.

A classic mathematical function of cryptography that transforms any content in the form of a large hexadecimal number composed of letters (from "A" to "F") and digits, is used. The content of the experiential block, which is enriched as the accounts of the Internet users (while following an actantial scheme) is then encrypted. The Actantial diagrams are noted according to the narrative program notations, and the Experiential contents are stored in the storybooks according to the actantial categories of the present disclosure.

If a member of the chain proposes a change in the book of experience narratives (e.g., a different ending), all members of the experiential co-creation chain are warned as the narrative units and components are distributed.

This system allows Internet users who access the social networks to offer experiences to their network and also to get paid by carrying out experiential transactions. A currency, then the experiential ECU, for "Experiential Currency Unit," can be implemented.

Co-creating collaborative experiences and sharing them with their network becomes possible without intermediary, which guarantees the transaction like collaborative transport.

Each of the participants in the experience creation chain has a database of photographs and texts and at first an empty special file of experiences co-constructed with the other members of the network. Users continue to add experiential content to their currently empty files. This collection of experiential content will form the "Register of book of narratives and experience units" to follow the transactions between the actors of the co-creation.

The method according to the present disclosure may implement two types of transactions:

transactions between members of the blockchain that allows to co-building experiences, transactions with a currency exchange (the experiential ECU, Experience Currency Unit) that allow network members to exchange co-constructed experiences.

A transaction can be defined as the right (e.g., for a brand) to come enriching a customer or user experience, for example, being the emitter in the scheme, so it must carry out one or more transactions with the custodians Experience through an experiential ECU regulation.

When the modification of the "book of narratives" file has been approved by the co-creators of the experiential chain or the supervisors, then the transaction takes place and the payment in experiential ECU is made.

Dissemination of Co-Built Experiences

According to a characteristic of the present disclosure, transactions in the chain of units of narratives of an experience, the component units of the experience narratives are selected so that the order of associated multimedia content is identical to the order and structures of the transactions in the chain-units of experiences.

When the experience is related to a narrative, with a narrative framework, the order and the structure in which the transactions are carried out in the unit chain of experiences are particularly important. This characteristic allows respecting the narrative frame and the actantial scheme of a narrative when made visible on the Internet.

A description of a customer's journey provided by implementing the process according to the present disclosure is given below, with reference to FIGS. 1 and 2.

1—Mr. T lived an experience a few minutes ago.

2—Mr. T decides to record his experience. To do so, he launches a chatbot automatically asking him a few questions. The questions and answers could be written, vocal and/or composed of various media (pictures, sounds and videos).

Questions aiming to decode the experience itself and catch its main components:

Narrative following an actantial scheme: Who was the subject of the experience? For what purpose? (quest, starting point) What happened? (Plot and facts, 3 tests) Who or what helped you to live this experience? (Helpers) Who or what hindered you? (Opponents, 3 tests).

Questions linked to the atmosphere and ambience

Where? When? With whom? How was the atmosphere? Which of your senses were engaged during your experience? How?

Questions linked to the emotional and human aspects

How did you react? How did you feel (before, during, after the experience)? What emotions did you experience/go through? (emotional path) What do you remember? What did this experience remind you of? Why? What did you like or hate most? What resonates the most with you? What touched you or bothered you? What was so special for you? What did you sense most?

By relating his experience, this tool will translate a lived experience into tangible and structured data in the digital world with all its dimensions and meaning.

3—The system will encrypt and store the answers on a secured platform based on a blockchain network so that people have enough trust to reveal their personal experiences.

4—Since we are all unique, we want to live a unique life, but life is made of a series of experiences, so we all want a series of unique experiences. In return, because we want experiences made for us reflecting our singularity (key driver), the platform will propose to Mr. T personalized experiences such as:

experiences pushed by his relatives (I've seen a concert for you), other users similar experiences (like Netflix adviser system)—67% of those who experienced that liked the new movie "The greatest Showman" and went to Island, new original and unique experiences ("experiential engine"). For some of them, you will need to use tokens to unlock experiences.

To make things real, the platform will redirect him to Booking/Uber/planes/online or physical stores/Concerts, theaters, NETFLIX®/UBEREATS®/DELIVEROO®/TRIPADVISOR® (Experiential adviser).

At the end, the customer has a new free content made for her or him (not only ads). "Share your own experiences and get new ones made for you! Better live your life, for free."

The process according to the present disclosure is thus dedicated to capture, store and share experiences and create new unique ones, and it provides with an experiential recommendation tool to reliably trace the experiences of individuals.

Many applications of the process according to the present disclosure are possible. Some of them are featured below:

Sharing Experiences: After the capture, it grinds and it comes out a new file format representing an experience (photo with clouds of words following the answers . . . ). Or autocomplete a post, Improved Customer Experience: Once the experiences are informed, the brand will know how to improve the customer experience, Accommodation applications: Advice and creation of new experiences (tokens or exp coins), e-commerce: share experiences of your customers linked to the products (and not simple review) and authenticate them.

simulation tools: Simulation of new digital experiences (travel, in shops . . . )

Imaginary Experiences Processing

The method according to the present disclosure may also be implemented to assist in generating imaginary experiences. A chatbot asks the users their experiential imaginaries, for example, "My dream is to go to a restaurant to have a good time with friends, in the Star Wars universe and in the rain." The user could ask the chatbot: "Can you propose several places that would match that?" The experiential imaginary would then meet the requirements of the actantial scheme.

The invention is of course not limited to the above-cited example and could be applied to many other cases and with various configurations without departing its claimed scope.

The invention claimed is:

1. A method of producing an experiential blockchain from processing experience-content data within natural language narratives provided by a user as multimedia content, comprising the steps of:

capturing experience-content data (i) from the multimedia content and (ii) as answers provided by the user on various media to a plurality of questions automatically asked by a chatbot; the plurality of questions comprising a question about who was a subject of an experience, a question about what was an objective of the experience, a question about who or what was a helper in the experience, and a question about who or what was an opponent in the experience, analyzing the captured experience-content data to identify narrative structures using natural language processing, machine learning, and structural semiotics;

linking each of the identified narrative structures to an actant category among subject, object, helper and opponent categories within an actantial model based, at least in part, on detecting, within the experience-content data, one or more markers among a predetermined set of markers based on a nearest neighbor search of the predetermined set of markers, each detected marker linking to an actant category;

capturing additional experience-content data until at least one narrative structure among the identified narrative structures is linked to each of the actant categories, encrypting the captured experience-content data;

storing the encrypted captured experience-content data as an experiential block of the experiential blockchain responsive to linking each of the identified narrative structures to an actant category;

sharing at least part of the experiential blockchain between a plurality of users responsive to one or more natural language narratives on one or more information media;

wherein each experiential block of the experiential blockchain is ordered according to a logical sequence based, at least in part, on the experience-content data;

wherein the plurality of questions that can be asked by the chatbot comprise a question about who was the subject of an experience, a question about what was the objective of the experience, a question about who or what was the helper in the experience, and a question about who or what was the opponent in the experience; and wherein the chatbot is programmed to capture additional experience-content data until at least one narrative structure among the identified narrative structures is linked to each of the actant categories.

2. The method of claim 1, wherein the analyzing step further includes detecting within the captured experience-content data one or more connectors among a predetermined set of connectors recorded within a connector database.

3. The method of claim 1, wherein the analyzing step further includes detecting within the captured experience-content data one or more feeling or emotion markers among a predetermined set of emotion markers within a dictionary of feelings and emotions.

4. The method of claim 1, wherein the analyzing step further includes detecting within the captured experience-content data one or more isotopies.

5. The method of claim 1, wherein the analyzing step further includes identifying within the captured experience-content data a set of tests comprising, respectively, a qualifying test, a decisive test and a glorifying test, so as to extract from the captured experience-content data proven experiences.

6. The method of claim 1, wherein the analyzing step further includes identifying within the captured experience-content data patterns of self-similarity, so as to as to provide fractal dimensions of experiences.

7. The method of claim 1, wherein the capturing step further includes capturing experience-content data from at least one social network or website, or an application Web.

8. The method of claim 1, further comprising a step of providing to a third party access to the experiential blockchain including experience-content data sharing at least one common marker.

9. The method of claim 1, wherein the method is implemented in a web application for travel or accommodation.

10. The method of claim 1, wherein the method is implemented in a transport web application.

11. The method of claim 1, wherein the method is implemented in a social network.

12. The method of claim 1, wherein the method is implemented in an e-commerce web application.

13. The method of claim 1, wherein the method is implemented in a foodtech web application.

14. The method of claim 1, implemented in a simulation tool.

15. The method of claim 1, wherein the method is implemented in an entertainment service.

16. The method of claim 1, wherein the method is implemented in a customer experience department.

17. The method of claim 1, further including one or more steps of capturing experience-content data as answers provided by the user on various media to a plurality of questions linked to atmosphere and ambiance perceived by the user and automatically asked by the chatbot.

18. The method of claim 1, further including one or more steps of capturing experience-content data as answers provided by the user on various media to a plurality of questions linked to emotional and human aspects and automatically asked by the chatbot.

* * * * *